United States Patent [19]

Aeppli

[11] Patent Number: 4,500,792
[45] Date of Patent: Feb. 19, 1985

[54] APPARATUS FOR CONTROLLING THE TITER OF SYNTHETIC FIBER TOWS

[75] Inventor: Kurt Aeppli, Uster, Switzerland

[73] Assignee: Zellweger Uster Ltd., Uster, Switzerland

[21] Appl. No.: 394,765

[22] Filed: Jul. 2, 1982

[51] Int. Cl.³ .............................................. G01B 11/10
[52] U.S. Cl. .................................... 250/560; 250/571; 356/385
[58] Field of Search ............... 250/559, 560, 561, 571; 356/384–387, 429

[56] References Cited

U.S. PATENT DOCUMENTS

| | | | |
|---|---|---|---|
| 3,017,801 | 1/1962 | Ingber | 356/385 |
| 3,158,852 | 11/1964 | Schacher | 250/561 |
| 3,719,425 | 3/1973 | Leitz et al. | 250/560 X |
| 3,901,606 | 8/1975 | Watanabe et al. | 250/560 X |
| 4,294,545 | 10/1981 | Stutz | 250/560 X |

Primary Examiner—Edward P. Westin
Attorney, Agent, or Firm—Antonelli, Terry & Wands

[57] ABSTRACT

An apparatus controls the titer of synthetic fiber tows by an optical measurement of the cross section of the tow. A ray beam which illuminates the tow from one side is directed towards a photodiode row, on which the tow throws its shadow. The number of photodiode elements of the diode row lying in the shadow produces a measurement for the cross section of the tow. In order to eliminate the form effect of the tows, they may be provided with a false twist by a twisting device or a suitable thread guide may be provided. In order to use the photodiode row in an improved manner, several tows may be guided next to each other and may be measured using one and the same lens system.

9 Claims, 5 Drawing Figures

APPARATUS FOR CONTROLLING THE TITER OF SYNTHETIC FIBER TOWS

FIELD OF THE INVENTION

The present invention relates in general to apparatus for use in the textile industry, and, more particularly, to an apparatus for controlling the titer of synthetic fiber tows.

BACKGROUND OF THE INVENTION

The titer of synthetic fiber tows should be controlled as near as possible to the spinneret of the spinning frame, in order to detect, in good time, all the influences which arise from the spinning solution and from the conveyance thereof through the spinning pump. Hitherto attempts using conventional measuring methods have been unsuccessful, because the influences of heat, moisture and preparations on the tow have not permitted an accurate and drift-free measurement over a sufficiently-long period of time.

Above all, attempts using capacitive measuring methods have been made which, however, have not been successful. In particular, the nature of tows has hitherto interferred with optical measuring, for the most part, because of the band-shaped cross section thereof; the result of which is that the tows produce different measured values, depending on the orientation thereof in the light beam. If the influence on this form effect could not be entirely overcome, then it could indeed be reduced by applying specific measures. However, this was only possible while accepting a considerable expense in terms of apparatus. The stability of the prior optical measuring systems was also unsatisfactory over a long period of time.

BRIEF DESCRIPTION OF THE INVENTION

It is therefore an object of the present invention to provide an apparatus for controlling the titer of synthetic fiber tows which avoids the many disadvantages which characterize the prior art.

The present invention avoids these disadvantages and relates to an apparatus for controlling the titer of tows formed from synthetic fibers, by use of a lens system and a photosensitive receiver, characterized in that at least one row of photodiodes is used as the photosensitive receiver, upon which the shadow projected by the tow impinges and leaves unexposed a number of photodiode elements corresponding to the cross section of the tow.

To accommodate tow of nonsymmetrical shape and eliminate variations in the shadow cast by the tow due to its orientation, the tow may be given a false twist at least in the area of the beam. On the other hand, if it is not desirable to apply a twist to the tow, the tow may be guided through a V-shaped notch in which the orientation of the fibrils forming the tow will be well defined at least in the area of the tow.

In accordance with another feature of the present invention, several tows may be simultaneously guided next to each other in the light beam and the shadow of each individual tow may be detected by the same photosensitive receiver to evaluate the titer thereof as a measured value.

Also, the beam lens system may be made to be adjustable so that the shadow of the tow may be made to impinge in enlarged form or reduced form on the plane of the photodiode row in the photosensitive receiver.

DETAILED DESCRIPTION OF PREFERRED EMBODIMENTS

Figure 1:
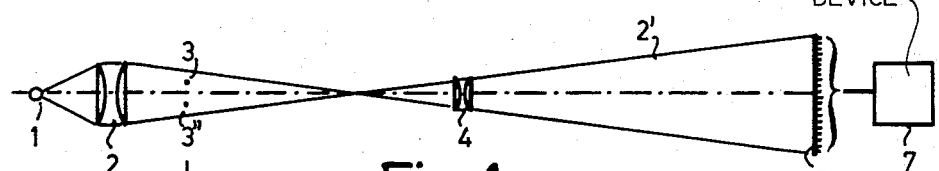
FIG. 1 illustrates a principle arrangement of the present invention as seen in the thread run direction.
Figure 2:
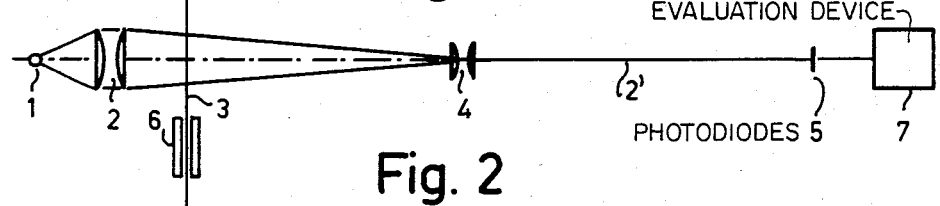
FIG. 2 illustrates the arrangement of FIG. 1 transversely to the thread run direction.

A light source 1 illuminates via a condenser lens 2 the thread (tow) 3 which is guided in the beam path 2'. The beam of light is projected onto a linear row of photodiodes 5 of a known type by means of a lens system 4, so that only those photodiode elements on this row 5 are exposed to the light which do not lie in the shadow of the tow 3. Thus, the number of the photodiode elements lying in the shadow will be greater or smaller depending on the cross section of the tow 3, and this number of unexposed photodiode elements is evaluated in an evaluation device to determine the cross section of the tow, and ultimately control the titer of the tow being formed. In this arrangement, the essential advantage which is derived from the use of photodiode rows results from the fact that the output signals thereof do not depend on the position of the tow in the ray beam, but only require a determination of the size of the shadow cast by the tow. This is performed by the evaluation device 7, which may be provided in the form of a microcomputer.

The form effect of the shadow formation by the orientation undefined per se of the tow in the beam path may be eliminated in a known manner by providing the tow with a false twist in the measuring area. During this procedure, the tow 3 is twisted in a helical manner by a twisting device 6 at least within the measuring area, so that on average a round tow cross section always comes into effect in the measuring area.

Figure 3:
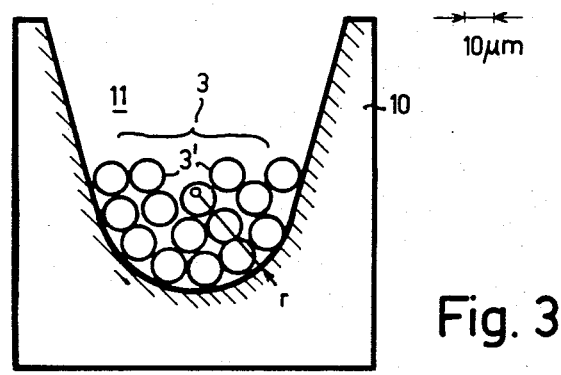
FIG. 3 illustrates the principle relating to use of a notch for effecting orientation of the tow.

If the use of a twist is not desired for textile reasons, then instead of a twisting device 6, a suitably-shaped guide element in the form of a notch may be used. The tow lies in this notch such that a definite arrangement of the fibrils 3' is obtained at least in the region of the beam path. FIG. 3 illustrates this principle on a greatly-enlarged scale. The V-shaped, or a U-shaped, notch 11 having a radius r of a few μm in the base of the notch is worked into a disc 10 which is preferably made of a very resistant material. The radius r is calculated such that it is suitable for filament diameters of about 20 μm and filament numbers of from 7 to about 50 which are conventional in practice. The design of the notch as described prevents the fibrils in each fibril number from being clamped or bound.

Figure 4:
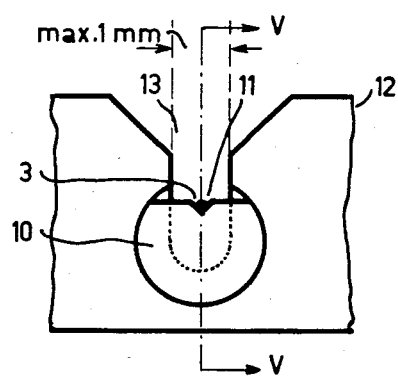
FIG. 4 is a top plan view of an example of a guiding notch.
Figure 5:
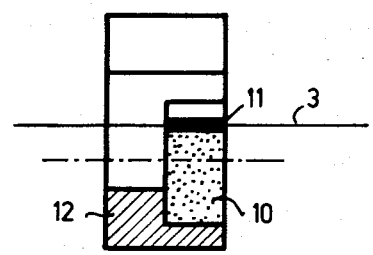
FIG. 5 is a sectional view taken along line V—V in FIG. 4.

FIGS. 4 and 5 illustrate an embodiment of a guiding notch in a plan view and in longitudinal section, respectively. A guide slit 13 is provided in a constructional body 12. A disc 10 is inserted concentrically to the curve in the base of the guide slit 13, and the actual notch 11 for receiving the tow 3 is made in the disc 10. Sapphire which is adequately resistant to the wear caused by the tow 3 passing through may be used, for example, as a material for the disc 10.

By means of the beam lens system 4, which is suitably adjustable, the shadow of the tow which is thrown onto the photodiode row 5 may be adjusted to be larger or smaller than the actual cross section of the tow. If the tow is very fine, an enlargement of the shadow is capable of producing a better resolution of the cross section. On the other hand, if the tow is very thick, then with a reduction of the shadow on the photodiode row 5, the latter may be used in a standard size, without having to make use of a special design. For this purpose, a control device for moving one or more lenses of the beam lens system 4 with respect to the tow 3 may be provided, and a position signal from the control device to the evaluation device 7 will then indicate the scale of magnitude being employed, so that proper control over the titer of the tow can be effected.

The apparatus according to the present invention has a number of advantages which could not be obtained using hitherto measuring methods. For example, such apparatus exhibits no drift because only the relative number of photodiode elements in the shadow of the two contributes to the result. There are also no temperature or moisture influences, and no influences caused by the preparation applied to the fibers of the tows. In addition, the form effect may be completely eliminated by suitable auxiliaries, and several adjacent threads (tows) 3,3" may be measured in one measuring procedure, because a very small lateral spacing thereof may be maintained. As apparent from the foregoing, the apparatus may be used with a single standard size of photodiode rows for fine and course tows by adapting the beam lens system, by which an enlargement or reduction of the shadow image projected on the photodiode row is achieved.

While I have shown and described on embodiment in accordance with the present invention, it is understood that the same is not limited thereto but is susceptible of numerous changes and modifications as known to a person skilled in the art, and I therefore do not wish to be limited to the details shown and described herein but intend to cover all such changes and modifications as are obvious to one of ordinary skill in the art.

What is claimed is:

1. An apparatus for controlling the titer of synthetic fiber tows, comprising light source means for projecting a light beam along a beam path through which at least one fiber tow is passed; photosensitive receiver means for receiving said light beam after it passes said tow, including at least one row of a predetermined number of photodiode elements upon which the shadow projected by the tow impinges and leaves unexposed to the light beam a number of photodiode elements indicative of the cross section of the tow; means for orienting the fibrils of said tow at least in the area of said beam path so as to provide said tow with a regular cross section at least along the length thereof which is intercepted by said light beam; and evaluation means responsive to said receiver means for producing an output signal to control the titer of the tow being formed on the basis of the detected cross section of the tow.

2. An apparatus according to claim 1, wherein said orienting means comprises means for imparting a temporary twist to said tow at least in the area of said beam path.

3. An apparatus according to claim 1, wherein said orienting means comprises guide means including a support member having a notch therein through which said tow passes, said notch having a configuration which results in the cross section of said tow being generally round as it crosses said beam path.

4. Apparatus according to claim 1, wherein mean is provided for passing at least two fiber tows across said beam path, and said evaluation means comprises means responsive to respective groups of said photodiode elements in said receiver means for producing separate outputs to control the titer thereof.

5. Apparatus according to claim 1, further comprising beam lens means for projecting onto said receiver means the light beam which has passed said tow, said beam lens means being adjustable so that the shadow of said tow impinges in an enlarged form on the plane of the photodiode row in said receiver means.

6. Apparatus according to claim 1, further comprising beam lens means for projecting onto said receiver means the light beam which has passed said tow, said beam lens means being adjustable so that the shadow of said tow impinges in a reduced form on the plane of the photodiode row in said receiver means.

7. A method for controlling the titer of synthetic fiber tows, comprising the steps of projecting a light beam along a beam path; passing at least one fiber tow through said beam path; detecting said light beam after it passes said tow by means of at least one row of a predetermined number of photodiode elements upon which the shadow projected by the tow impinges and leaves unexposed to the light beam a number of photodiode elements indicative of the cross section of the tow; orienting the fibrils of the tow at least in the area of said beam path so as to provide said tow with a regular cross-section at least along the length thereof which is intercepted by said light beam; evaluating the outputs of said photodiode elements to detect the cross section of the tow; and producing a signal to control the titer of the tow being formed on the basis of the detected cross section of the tow.

8. A method according to claim 7, wherein said step of orienting the fibrils of the tow comprises imparting a temporary twist to said tow at least in the area of said beam path.

9. A method according to claim 7, wherein said step of orienting the fibrils of the tow comprises passing said tow over a support member having a notch through which said tow passes in such a way that the cross section of said tow is made generally round as it crosses said beam path.

* * * * *